(12) United States Patent
Meitzler et al.

(10) Patent No.: US 8,583,193 B2
(45) Date of Patent: Nov. 12, 2013

(54) HAND-HELD COMMUNICATION DEVICE WITH AUXILIARY INPUT APPARATUS AND METHOD

(75) Inventors: William H. Meitzler, Elk Grove Village, IL (US); Adrian Napoles, Lake Villa, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/344,958

(22) Filed: Jan. 6, 2012

(65) Prior Publication Data

US 2012/0108233 A1 May 3, 2012

Related U.S. Application Data

(62) Division of application No. 11/946,996, filed on Nov. 29, 2007, now Pat. No. 8,116,831.

(51) Int. Cl.
*H04W 24/02* (2009.01)
*H04W 88/02* (2009.01)

(52) U.S. Cl.
USPC .................. 455/575.1; 455/106; 455/575.5; 455/575.6; 455/575.7

(58) Field of Classification Search
USPC .......... 455/575.1, 575.5, 575.6, 575.7, 575.8, 455/90.3, 550.1, 101, 107, 106, 120–121, 455/123–126, 128–129, 269, 301–302, 455/13.3, 19, 25, 63.1, 63.4, 67.11, 67.13, 455/82
See application file for complete search history.

(56) References Cited

U.S. PATENT DOCUMENTS

| 6,947,028 | B2 * | 9/2005 | Shkolnikov ................... 345/156 |
| 7,221,520 | B2 * | 5/2007 | Dowling et al. ............. 359/698 |
| 7,659,855 | B2 * | 2/2010 | Mashima et al. ............. 343/702 |
| 2004/0152497 | A1 | 8/2004 | Odachi et al. |
| 2005/0096081 | A1 | 5/2005 | Black et al. |
| 2008/0032756 | A1 | 2/2008 | Kanazawa |
| 2008/0039043 | A1 | 2/2008 | Yamazaki et al. |
| 2009/0117951 | A1 * | 5/2009 | Alameh et al. ............. 455/575.1 |
| 2010/0035567 | A1 | 2/2010 | Vin |
| 2010/0233996 | A1 * | 9/2010 | Herz et al. .................... 455/411 |
| 2010/0255885 | A1 * | 10/2010 | Lee ............................... 455/566 |
| 2011/0003550 | A1 * | 1/2011 | Klinghult et al. ............ 455/41.3 |

(Continued)

FOREIGN PATENT DOCUMENTS

WO 2006094308 A2 9/2006

OTHER PUBLICATIONS

Eaton, et al.: "Comparison of Bulk-and-Surface-Micromachined Pressure Sensors", Micromachined Devices and Components, Proc SPIE, vol. 3514, p. 431, Sep. 1995, all pages.

*Primary Examiner* — Pablo Tran

(57) ABSTRACT

A hand-held communication device, such as a cellular telephone or a personal digital assistant (PDA), comprises a sensor assembly and an auxiliary input interface. The auxiliary input interface is situated along one or more exterior surfaces of the device and is electrically coupled to processing circuitry within the device. The sensor assembly is removably attached to the one or more exterior surfaces of device and provides signals at the multiple outputs in response to tactile inputs from the user. In one embodiment, an assignment procedure assigns tactile inputs from the user to predefined functions of the device and/or one or more software applications installed in the device. During subsequent operation of the device, each of the specific tactile input executes one or more predefined functions.

3 Claims, 6 Drawing Sheets

(56) References Cited

U.S. PATENT DOCUMENTS

| | | | |
|---|---|---|---|
| 2011/0053641 A1* | 3/2011 | Lee et al. | 455/556.1 |
| 2011/0319128 A1* | 12/2011 | Miwa | 455/550.1 |
| 2012/0046082 A1* | 2/2012 | Higashiyama et al. | 455/566 |
| 2012/0052929 A1* | 3/2012 | Thammasouk et al. | 455/575.1 |
| 2012/0064922 A1* | 3/2012 | Podoloff et al. | 455/456.6 |
| 2012/0206556 A1* | 8/2012 | Yu et al. | 348/14.02 |

* cited by examiner

HAND-HELD COMMUNICATION DEVICE WITH AUXILIARY INPUT APPARATUS AND METHOD

CROSS-REFERENCE TO RELATED APPLICATIONS

This application is a divisional of co-pending U.S. patent application Ser. No. 11/946,996, filed on Nov. 29, 2007, which is hereby incorporated by reference in its entirety.

FIELD OF THE INVENTION

The present invention relates to the general field of hand-held communication devices such as cellular telephones and personal digital assistants (PDAs). More particularly, the present invention relates to a hand-held communication device that includes an auxiliary input apparatus, as well as a method for adapting a hand-held device to include an auxiliary input apparatus.

BACKGROUND OF THE INVENTION

For hand-held communication devices, such as cellular telephones and personal digital assistants (PDAs), there is an ongoing need for approaches by which to accommodate additional inputs from a user of the device so as to allow the user to access and execute as many device functions as possible in a fast and convenient manner. Conventional input devices such as keypads and special-purpose switches (e.g., volume controls) are widely employed in existing devices, but the available surface space on the devices is usually quite-limited and typically discourages deployment of additional keypads or additional special-purpose switches.

In order to accommodate the rapidly increasing number of functions that are incorporated in modern hand-held communication devices, a common approach has been to provide the devices with a software-driven menu system. Typically, the devices include a limited number of special keys located on, or in the vicinity of, a keypad, which are manipulated by the user to navigate through the various menus and select the desired function(s). While a menu system is useful and efficient in many ways, it is plagued by the fact that it is generally not very user-friendly, and requires significant effort and time on the part of the user in order to navigate to, and select, a given function. The menu system approach is particularly inconvenient in the case of functions that are frequently accessed by a given user, in which case the user is tasked with having to repeatedly (i.e., for each time that a given function is desired) navigate through the menus and select the given function. Thus, a need exists for an approach by which a user may readily define a significant number of functions of the device that can be quickly accessed without requiring the user to navigate through the associated menus leading to that function.

Another trend in hand-held communication devices involves the proliferation of various software applications that are installed within the devices. Generally, different software applications have different sets of essential/preferred inputs by which the user interacts with the software application. This is especially true in the case of gaming applications (i.e., video games) where, for instance, one video game may require a relatively simple set of inputs (e.g., move forward, move back, move left, move right), while a different video game may require a more extensive set of inputs (e.g., move forward, move back, move left, move right, jump, run, fire pistol, toss grenade, etc.). Thus, a need exists for an approach by which hand-held communication devices may be adapted to accommodate the different input requirements of various software applications in a manner that is convenient to the user. A further need exists for an approach by which a hand-held device may be adapted to include an auxiliary input apparatus that may be customized to each of a number of software applications installed in the device.

One problem with wireless hand-held communication devices relates to limitations of antenna systems employed in such devices. These antennas typically do not function very well if covered by a lossy medium (e.g., a user's hand). In addition, devices may utilize multiple antennas such as to cover various bands or for different functions of the device or different systems, e.g., GPS, WIFI, and Bluetooth. Accordingly, antenna performance may be compromised depending on how the device is gripped and/or depending on a particular function the device is performing.

Thus, a need exists for an approach by which a hand-held communication device may be adapted to include an auxiliary input apparatus so as to satisfy the aforementioned needs in a convenient, cost-effective, and ergonomic manner. Such a device, and a corresponding method, would provide a user with added convenience and useful options as to preferences and customization options, and would therefore represent a considerable advance over the prior art.

DETAILED DESCRIPTION OF THE PREFERRED EMBODIMENTS

Figure 1:
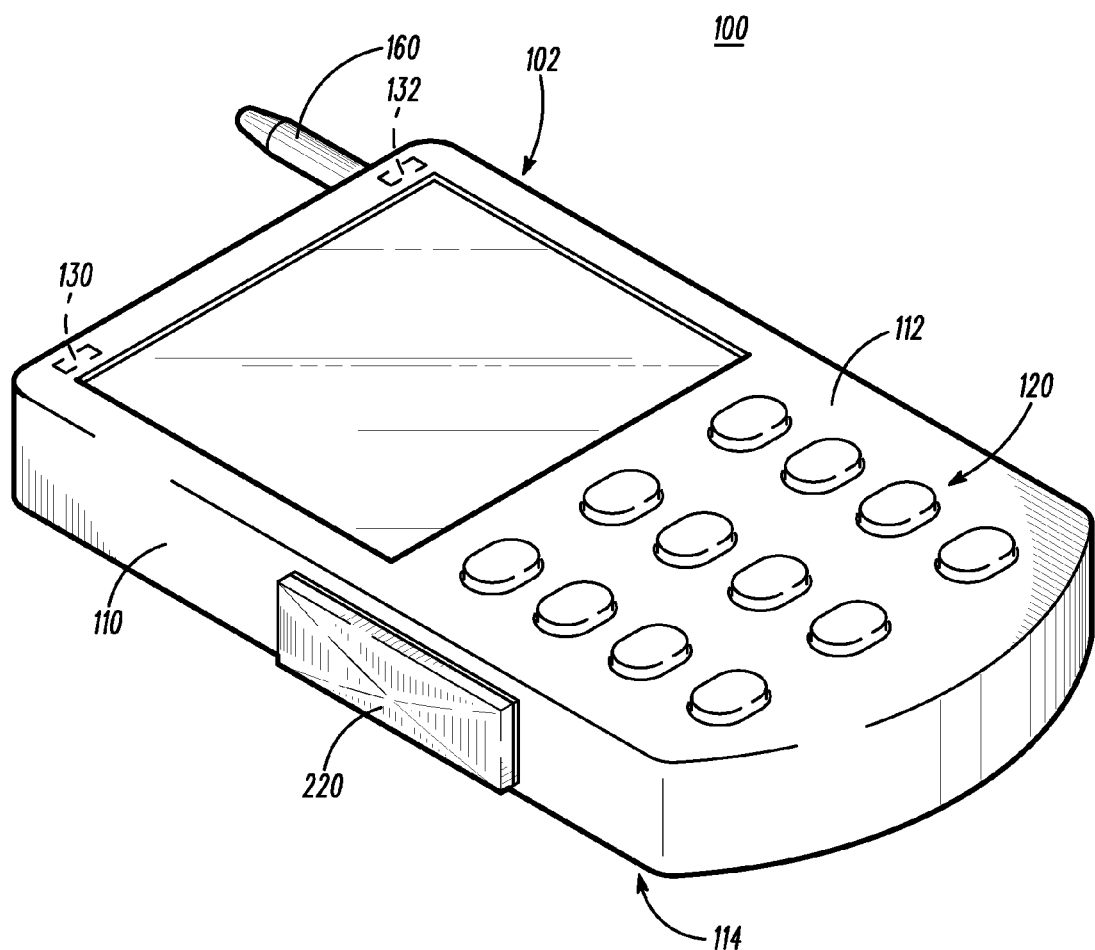
FIG. 1 is a perspective view of a hand-held communication device showing a housing including a sensor assembly attached along one side thereof in accordance with a preferred embodiment of the present invention.
Figure 2:
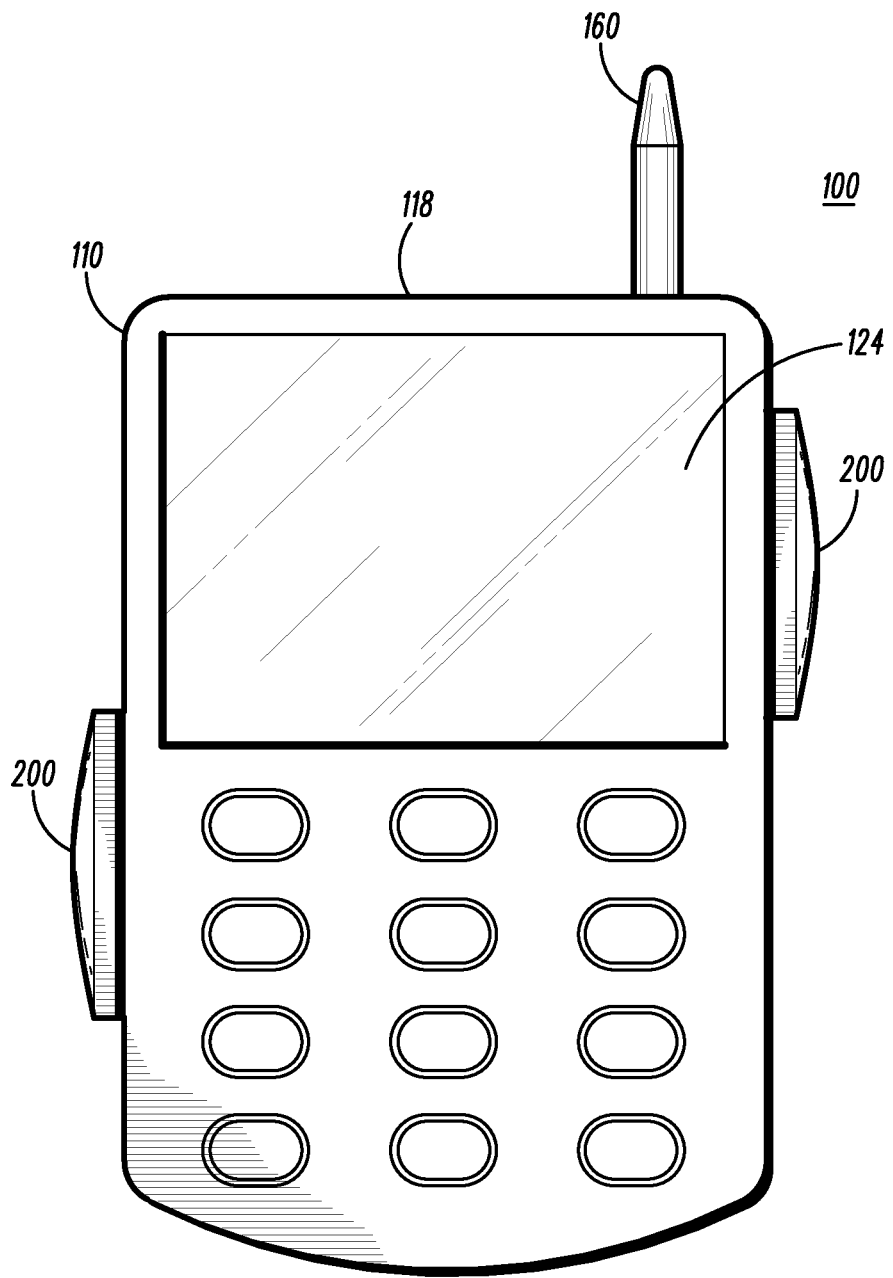
FIG. 2 is a plan view of the device of FIG. 1, showing an additional sensor assembly attached along an opposite side of the housing.
Figure 3:
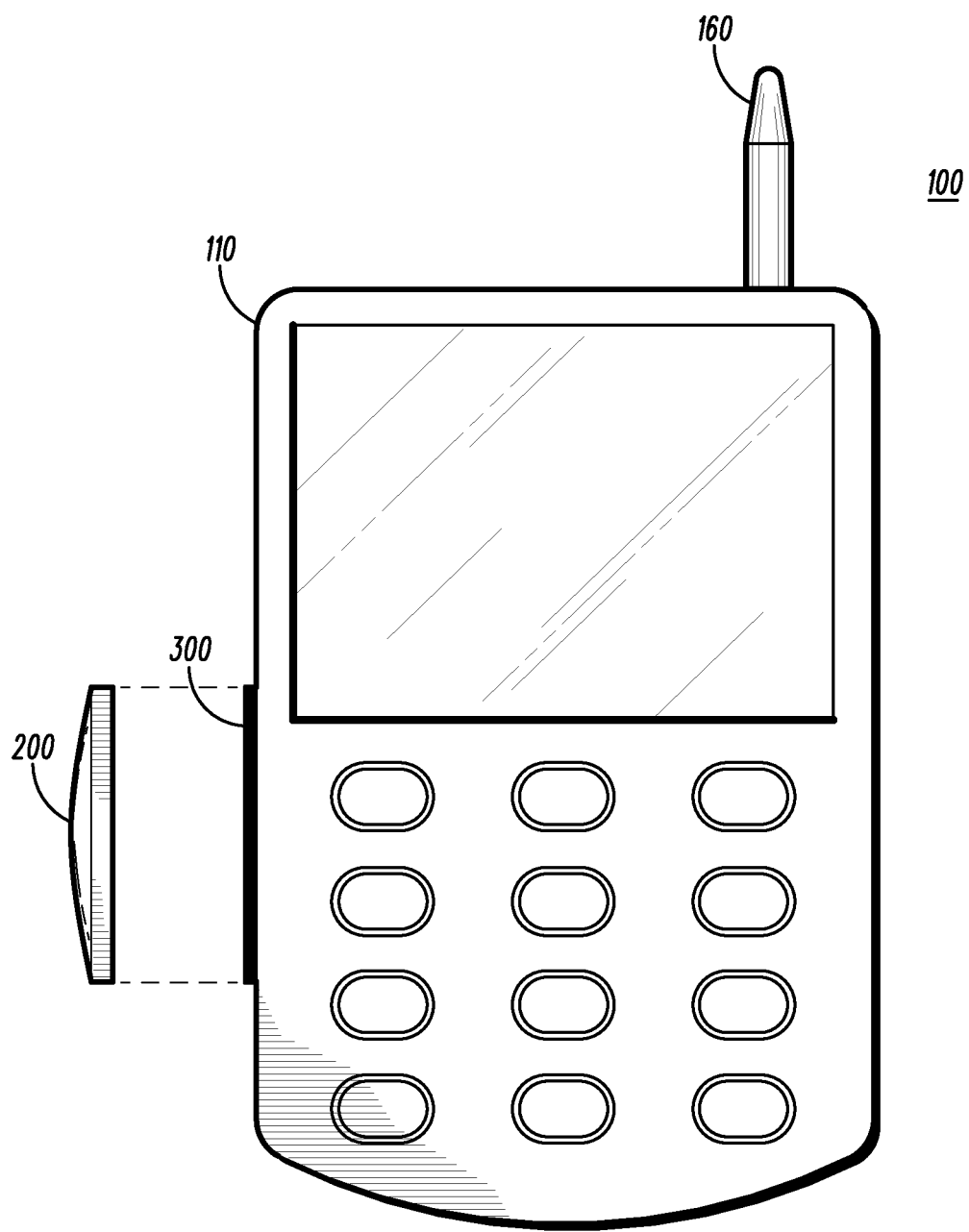
FIG. 3 is an exploded, plan view of the device of FIG. 1 showing an auxiliary input interface on the housing with the sensor assembly disconnected therefrom.
Figure 4:
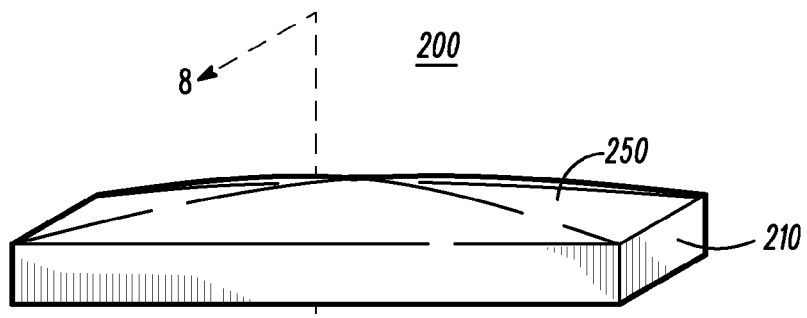
FIG. 4 is a perspective view of the sensor assembly having a generally block-shaped configuration with an upper arcuate portion for user-engagement therewith.
Figure 5:
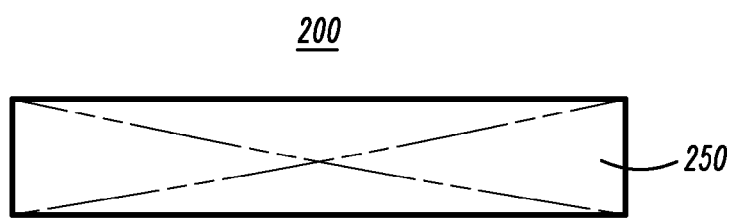
FIG. 5 is a plan view of the sensor assembly of FIG. 4.
Figure 6:
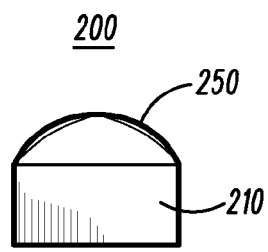
FIG. 6 is an elevational end view of the sensor assembly of FIG. 4, showing a lower portion below the upper arcuate portion.

FIGS. 1-3 describe a hand-held communication device 100 that includes a sensor assembly 200 and an auxiliary input interface 300. Device 100 may be any of a number of hand-held communication devices, such as a cellular telephone or a personal digital assistant (PDA).

Sensor assembly 200 is attached to at least one exterior surface portion (e.g., a left side surface portion 110) of a compact housing 102 of the device 100 sized to be readily hand-held by a user thereof, and includes multiple pressure sensors and multiple outputs. The multiple pressure sensors of sensor assembly 200 are adapted to receive tactile (e.g., finger-related or grip-related) inputs from a user of device 100. The multiple outputs of sensor assembly 200 are adapted for coupling to an auxiliary input interface 300. During operation, sensor assembly 200 provides signals at the multiple outputs in response to the tactile inputs from the user. More specifically, tactile inputs from a user, which consist of one or more pressures applied by one or more of the user's fingers along the length of sensor assembly 200, are detected by the sensor assembly 200 and are relayed to processing circuiting in the housing 102 of the device 100 via the auxiliary input interface 300 thereof.

Sensor assembly 200 may be permanently attached to device 100 at the time of manufacture of device 100; alternatively, and preferably, sensor assembly 200 is removably attached to device 100, so as to allow a user (at some point in time after the manufacture and/or purchase of device 100) to attach different versions of sensor assembly 200 to device 100. In this regard, the sensor assembly 200 and the housing 102 via the auxiliary input interface 300 can have a detachable connection 180 therebetween, as shown in FIG. 3, to allow a user to interchange sensor assemblies 200 on the device 100.

Auxiliary input interface 300 is situated along at least one exterior surface (e.g., left side surface portion 110) of device 100, and is electrically coupled to circuitry (i.e., processing circuitry) within device 100. Auxiliary input interface 300 also has electrical contacts so that it serves as a means for coupling the electrically conductive outputs of sensor assembly 200 to processing circuitry within device 100. The processing circuitry within device 100 functions to correlate certain signal(s) from the outputs of sensor assembly 200 with certain functions of device 100.

Auxiliary input interface 300 may be realized by any of a number of suitable structures. Preferably, auxiliary input interface 300 is realized by a thin printed circuit board, such as a so-called flex circuit, which has the advantages of being economical and of providing a thin profile that does not excessively protrude beyond the surface portion 110. Moreover, as will be appreciated by those skilled in the art, surface portion 110 may include a recessed region for accommodating interface 300 in a manner such that interface 300 either minimally protrudes beyond, is flush with, or is recessed in relation to, the surface defined by surface portion 110.

Sensor assembly 200 and auxiliary input interface 300 may be situated along any of a number of suitable surfaces, or along multiple suitable surfaces, of device housing 102. The surface(s) along which sensor assembly 200 and auxiliary input interface 300 are situated should, of course, be free of any other existing input means for device 100, and should be conveniently located for the user. As illustrated, the sensor assembly 200 is mounted to one of the peripheral, side surface portions that extend about and between the front and back main surfaces 112 and 114, respectively, of the device 100, such as left side surface portion 110. Multiple sensor assemblies 200 may be mounted to the housing 102 such as including the additional sensor assembly 200 mounted to the right side surface portion 116 of the housing 102, as shown in FIG. 2. These peripheral side surface portions are normally gripped during operation of the hand-held communication device 100. As can be seen in FIGS. 1-3, in addition to the sensor assembly 200, the hand-held communication device 100 includes a keypad arrangement 120 on the front surface 112 thereof which can include several keys 122 coupled to the processing circuitry of the device to allow for character and other input to the device 100. In addition, the device 100 has a display 124 mounted to the front surface 112 thereof generally above the keypad 120. The keypad arrangement 120 including the keys 122 could also be implemented as touch keys via the display 124 using display touch (capacitive, resistive, or pressure) sense technologies.

During operation, the circuitry of the device 100 may be configured to perform an assignment procedure wherein specific tactile inputs to sensor assembly 200 are assigned to specific predefined functions of device 100. During normal operation (i.e., after completion of the assignment procedure), device 100 then performs a specific predefined function in response to a specific corresponding tactile input being applied to sensor assembly 200. Preferably, the assignment procedure is controlled by appropriate software within device 100; in that case, the software for performing the assignment procedure is executed via the device circuitry at some point in time after sensor assembly 200 is attached to device 100.

In one embodiment, the user provides corresponding inputs during the assignment procedure in order to define which specific tactile inputs will be assigned to which specific predefined functions of the device. In an alternative embodiment, the assignment procedure is performed on a priori basis, wherein the circuitry of the device 100 is pre-programmed (e.g., at the time of manufacture or prior to initial activation of device 100) to treat specific tactile inputs as being assigned to specific predefined functions. In the latter case, device 100 will be intended for use with certain pre-specified configurations for sensor assembly 200.

When device 100 is realized as a cellular telephone, the specific predefined functions may include any or all of a large number of functions that are commonly included in modern cellular telephones. It is contemplated, by way of example, that the specific predefined functions may include any or all of the following: (1) a speed-dial function, wherein the telephone dials a pre-assigned telephone number in response to a specific tactile input; (2) a phone directory review function, wherein the telephone audibly announces a list of stored names in response to a specific tactile input; (3) a combined phone directory review and speed-dial function, wherein, in response to a first specific tactile input, the telephone audibly announces a list of stored names, and, in response to a second specific tactile input that is received while the telephone is audibly announcing the list of stored names, the telephone speed-dials a telephone number corresponding to the last stored name that was audibly announced at the time when the second specific tactile input is received; and (4) an expedited menu access function, wherein the telephone displays a pre-assigned screen menu in response to a specific tactile input.

Preferably, device 100 is also capable of ascertaining a user's hand grip position, which typically entails multiple pressure inputs being simultaneously applied to different points on sensor assembly 200. In this regard, the sensor assembly 200 preferably has an elongate configuration so that multiple fingers of user gripping the housing 102 may be engaged therewith. In addition, as previously mentioned, multiple sensor assemblies 200 can be mounted at various locations about the housing 102 on the peripheral side surface portions thereof.

The circuitry of the device 100 may use the information relating to the user's hand grip position to perform any of a number of useful functions. By way of example, it is contemplated that the detection of the user's hand grip position may be used to optimize or enhance the reception of a wireless signal by device 100. For instance, when device 100 includes at least one or more antennas such as internal antennas 130 and 132 in the housing 102 for receiving a wireless signal, and in response to a user hand grip position that coincides with the wireless signal having a field-strength intensity that is less than a predetermined level (e.g., about −90 dBm for an 850 MHz, PCS, or Bluetooth signal, and −150 dBm for a GPS signal. Predetermined power levels preferably will be set about 3 dB above the wireless devices Total Isotropic Sensitivity receiver sensitivity specification of the wireless device for the specific band, service, and modulation scheme being used), the circuitry is configured so that the device 100 may inform or alert the user of the a need to alter the hand grip position (i.e., so as to attempt to minimize any power absorption or antenna resonance detuning that may be attributable to the position of the user's hand relative to the location of the antenna within the device). As another example, if device 100 includes two or more antennas, and in response to a user hand grip position that coincides with the wireless signal having a field-strength intensity of less than a predetermined level, the circuitry of the device 100 may automatically select and operate with an appropriate antenna or combination of antennas (from two or more available antennas) such that the field-strength intensity of the wireless signal is increased without any action or intervention on the part of the user being required.

Accordingly, the sensor assembly 200 is well suited for use as an antenna selector so that the device circuitry can use the information regarding the detected hand grip, such as associated with different housing orientations in different modes of operation of the device 100, to select the appropriate antenna or combination of antennas to provide the best signal strength for the wireless device 100. In another aspect, the sensor assembly 200 may be used as an orientation sensor. Present art uses a gravitational pull sensor to determine if the phone 100 is held more horizontally such as with images displayed on the screen 124 in the landscape mode or more vertically such as with images displayed on the screen 124 in the document mode. As indicated, in most cases the user holds the phone 100 differently when using the phone 100 in the different modes. Thus, the tactile pressure sensor 200 described herein can be used instead of or in addition to present gravitational and accelerometer orientation technology to better define to the internal processing circuitry not only the gravitational pull forces on the device, but also the hand grip location and/or force on the device. For example, two sensor assemblies 200 mounted at different locations about the phone housing 102 together will give the device circuitry a better chance of predicting the user's intended use for the device 100 allowing it to better predict the mode in which the user is employing the device 100. Use of a gravitational sensor alone may not accurately predict where the hand is holding the phone device 100. Accordingly, without positive information regarding the user's grip, the phone's circuitry will not as likely be able to accurately predict where the user is holding the phone 100. Thus, if the wireless device 100 has several antennas to choose from whereby each antenna is more resistant to negative hand grip effects of a specific grip, and it knows the grip that is being applied to the housing 102, it can choose the best antenna on the phone 100 to negate hand grip losses without needing to measure receiver performance from each available antenna (which is a long utilized methodology in the art).

In addition to being used for accessing and/or executing predefined functions of device 100, and/or well for ascertaining a user's hand grip position, sensor assembly 200 may also be used for accessing and/or executing functions associated with one or more software applications installed within device 100 via the circuitry thereof. In this regard, it is preferred that the circuitry of the device 100 be configured to be further operable to perform a customization procedure wherein specific tactile inputs to sensor assembly 200 are assigned to specific predefined functions of the software application(s) installed within device 100. Following completion of the customization procedure, the software application(s) and device 100 perform the predefined functions when corresponding tactile inputs are applied to sensor assembly 200.

It is contemplated that the software application(s) installed in device 100 may include one or more gaming applications, in which case sensor assembly 200 may be utilized as a set of custom game controls. Preferably, and especially when intended for use with one or more gaming applications, sensor assembly 200 may be configured with physical characteristics that are tailored to (i.e., optimized for) each of the gaming applications. Those physical characteristics may include any or all of the following: (1) physical dimensions of sensor assembly 200; (2) the number of pressure sensors in sensor assembly 200; (3) the spatial distribution of the pressure sensors in sensor assembly 200; and (4) the amount of pressure that must be applied by the user to actuate a given pressure sensor in sensor assembly 200, as will be discussed further hereinafter.

It is further envisioned that device 100 may be adapted to operate in conjunction with any of a number of different sensor assemblies, wherein each of the different sensor assemblies is tailored to one or more specific software or gaming applications. For instance, if a user wishes to install a particular gaming application in device 100, the user may purchase a specialized sensor assembly 200 (presumably manufactured and/or distributed by the same company that developed, manufactured, and/or distributed the software gaming application) that is specially configured and/or optimized for that particular gaming application; the user may then attach the sensor assembly to device 100 prior to using the gaming application. In one embodiment, the gaming application and sensor assembly 200 are pre-configured such that various tactile inputs to sensor assembly 200 are pre-assigned to various functions of the gaming application. In an alternative embodiment, the gaming application may allow customization options wherein the user is allowed to define, at least to some extent, which specific tactile inputs will be assigned to which specific functions of the gaming application.

A preferred structure for realizing sensor assembly 200, and further details regarding the operation of sensor assembly 200, are described with reference to FIGS. 4-9 as follows.

Preferably, sensor assembly 200 is economically and advantageously realized by an arrangement that includes an elastomeric connector 210 (also commonly referred to as a "zebra strip" connector) and a flexible cap or upper arcuate portion 212 that is configured for contact with a user's fingers that is configured for contact with a user's fingers. Sensor assembly 200 can be designed to be much simpler than the auxiliary input interface 300. For example, interface 300 may have a very large number of electrical contacts available to measure tactile pressure to within one mm. Sensor assembly 200 can have very long internal conductive strips, as discussed hereinafter, and only use a few of the electrical contacts within interface 300, depending upon the application. One of the novel features is that the complexity and completeness of the device 100 to human interface (assembly 200) is dictated only by assembly 200, which is a user replaceable and user exchangeable part.

Figure 7:
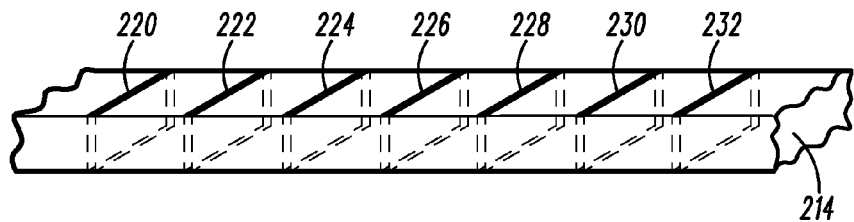
FIG. 7 is a perspective fragmentary view of the lower portion of the sensor assembly of FIG. 4, showing an elastomeric block-shaped body thereof including spaced conductive elements therein.

As illustrated in FIG. 7, which provides a magnified and detailed view of a section taken from the overall length of sensor assembly 200, elastomeric connector 210 includes a lower, elongate block-shaped body 214 of insulating material and a plurality of parallel conductive regions or planes 220, 222, . . . , 232 that are embedded in the block body 214 of insulating material. The number of conductive regions in the elastomeric connector is sufficient to provide at least one conductive path back to the auxiliary input interface 300 that is understood by the interface with proper software for each pressure point measured. In this regard, it is anticipated that the elastomeric connector 210 can have far more vertical conductive planes than are needed, allowing for the interface 300 to have many inputs while the sensor assembly 200 that is user changeable, can have varying lesser numbers of inputs and outputs. In this manner, it is very easy to connect at least some of the contacts or pairs of conductive planes of the sensor assembly 200 with those of interface 300 without requiring precise positional alignment such as with conductive planes at either longitudinal end of the elongate sensor assembly 200. As shown, the conductive regions can be in the form of transverse conductive flat plates or layers 220-232 extending across the insulative block body 212, and vertically embedded therein.

Elastomeric connector 210 may be realized by any of a number of commercially available components, such as a so-called "ZEBRA" type elastomeric connector (manufactured by Fujipoly, Inc.). Preferably, the insulating material is composed essentially of a non-conductive silicon rubber, while the parallel conductive regions or plates are preferably composed essentially of either a conductive carbon or a conductive silicon rubber.

Elastomeric connector 210 is selected to have a length, a width, and a thickness that is suitable for attachment to a chosen available exterior surface on device 100, and that is consistent with the objective of providing sensor assembly 200 with physical dimensions and "tactile feel" characteristics that are conducive to the comfort and convenience of the user. Additionally, elastomeric connector 210 may be selected to have a color and/or finish that matches or aesthetically complements the exterior appearance of device 100.

During operation of device 100, when sensor assembly 200 is electrically connected to auxiliary input interface 300, and in the absence of any tactile input being applied to the upper portion 212 of sensor assembly 200, each of the pairs of adjacent conductive planes will include one conductive plane (e.g., 220) at a low level electrical potential (e.g., +5 volts or so) and the other conductive plane (e.g., 222) at a so-called "floating" potential (i.e., not connected to any fixed electrical potential within device 100). That is, for example, each of conductive planes 220, 224, 228,232 will be at +5 volts, while each of conductive planes 222,226,230 will be left at a floating potential. During operation of device 100, processing circuitry within device 100 effectively monitors (via interface 300) each of the conductive planes (e.g., 222,226,230) that are normally (i.e., in the absence of tactile input) at a floating potential. When a tactile input is applied to sensor assembly 200, one or more of the normally floating conductive planes will cease to be at a floating potential and will transition (at least as long as sufficient tactile pressure remains applied) to a low voltage potential (e.g., +5 volts or so). The change in the voltage of one or more of the conductive planes from a floating potential to a low voltage potential is detected and acted upon by the processing circuitry within device 100. As a user's hand pushes harder, more of the hand and/or fingers come in contact with the pressure sensors of sensor assembly 200. Thus more adjacent circuits are closed in the sensor assembly 200 allowing the phone circuitry to estimate pressure amount by the number of adjacent circuits closed.

In one embodiment, the conductive regions 220, 222, . . . , 232 of elastomeric connector 210 are uniformly distributed along a length of block body 214; that is, the spacing between each of the pairs of adjacent conductive regions is about the same. Alternatively, the conductive regions 220, 222, . . . , 232 may be non-uniformly distributed along a length of block 210, such that the spacing between each of the pairs of adjacent conductive regions is not necessarily the same; it is contemplated that a non-uniform distribution of the conductive regions along the length of block 210 may be useful or preferred in certain instances, such as for gaming applications.

Figure 8:
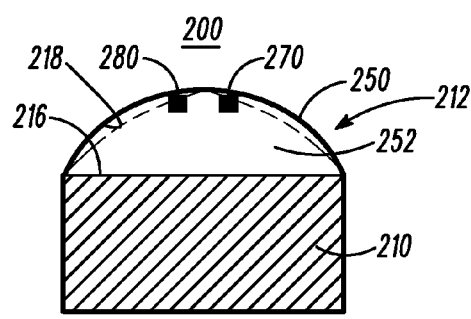
FIG. 8 is a cross-sectional view of taken along line 8-8 of FIG. 4, showing a pair of conductive strips in the upper arcuate portion of the sensor assembly.

Referring now to FIGS. 4-6, 8, and 9, the upper or user engagement portion 212 of sensor assembly 200 includes a flexible, arcuate shroud or membrane 250 and a plurality of conductive strips 270,272,274,280,282,284. Shroud 250 is composed of a flexible insulating material (e.g., the same material(s) used for fabricating the insulated portion of block 210, such as a non-conductive silicon rubber) and is attached to a top surface 216 of elastomeric block 210. Shroud 250 is configured to receive, and to substantially deform in response to, tactile inputs from a user. The plurality of conductive strips 270, 272, . . . , 284 is disposed within an interior portion of shroud 250 between the shroud 250 and the block body 214, such as connected to the interior surface 218 of the shroud 250, as shown in FIG. 8. When shroud 250 is deformed in response to a tactile input from a user, at least one of the conductive strips 270, 272, . . . , 284 electrically contacts at least two adjacent parallel conductive regions 220, 222, . . . , 232 of elastomeric connector 210 exposed at upper surface 216 thereof.

Preferably, and as illustrated in FIGS. 4-6 and 8, shroud 250 has a configuration that substantially resembles an elongated dome. It is further preferred that the electrical contacts between shroud 250 and elastomeric connector 210 be sealed (hermetically or otherwise) so as to minimize or prevent any possible contamination or shorting (due to dirt, moisture, etc.) of the conductive regions 220, 222, . . . , 232 of elastomeric connector 210.

In order to provide appropriate degrees of resilience and pressure-sensitivity, and to ensure that conductive strips 270, 272 come into contact with conductive regions 220, 222, . . . 232 only in response to a sufficient tactile pressure being applied to shroud 250, it is preferred that shroud 250 further include an air-filled cavity 252 in which the conductive strips 270, 272 are disposed. It will be appreciated that the pressure of the air within air-filled cavity 252 is an important parameter (along with the resiliency/stiffness and thickness of the material(s) selected to fabricate shroud 250) in defining the amount of tactile pressure that must be exerted upon shroud 250 in order to cause conductive strips 270,272 to come into contact with corresponding conductive regions 220, 222, . . . , 232. Accordingly, the pressure in the cavity 252 can be customized so that the sensor assembly 200 has a specific feel that is tailored to a user's preference for tactile pressure required to be applied to the shroud 250 to close a contact and actuate a sensor along the sensor assembly 200. In this regard, the sensor assembly 200 can be relatively firm with higher levels of air pressure in the cavity 252 or relatively soft or easy to press or actuate with lower levels of air pressure in the cavity 252.

As mentioned earlier, the sensor assembly 200 may be utilized as a game controller. In this context, precise positioning of the fingers on the sensor assembly 200, and particularly shroud 250 thereof typically will be desirable. Accordingly, the shroud 250 can be provided with indicia thereon to allow a user to precisely orient their fingers extending across the shroud 250. For instance, the indicia can be raised from the surface of the shroud 250 such as by a laterally extending ridge 254 (FIG. 2) extending transversely across the center of the elongate sensor assembly 200 so as to provide a user with tactile feedback as to the positioning of their fingers thereon.

Figure 9:
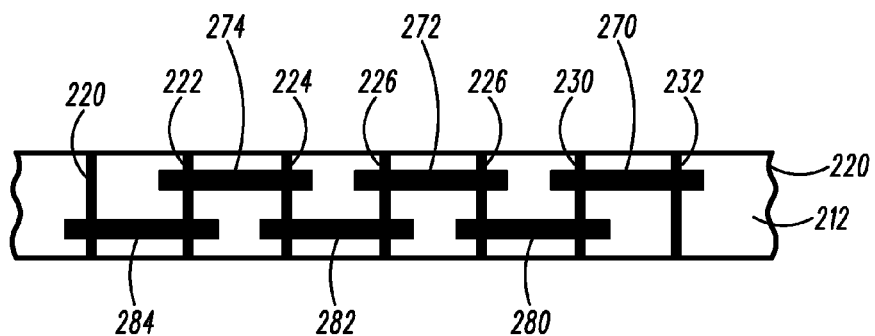
FIG. 9 is a fragmentary plan view of the sensor assembly with an arcuate shroud of the arcuate upper portion removed to show the conductive strips overlying the conductive elements of the sensor assembly.

FIG. 9 depicts, for the sake of clarity, each of conductive strips 270, 272, . . . , 284 as being separate components. While it is contemplated that the top portion of sensor assembly 200 may be realized with each the conductive strips 270, 272, . . . , 284 separately attached to the interior surface 218 of shroud 250, it should be appreciated that alternative constructions are also contemplated. For instance, each of the conductive strips in the upper line (i.e., 270, 272, 274, . . . ) and each of the conductive strips in the lower line (i.e., 280, 282, 284, . . . ) may be mechanically connected together (preferably with a substantially flexible medium) such that each of the upper line and the lower line can be realized by a single elongated structure that runs substantially the entire length of sensor assembly 200. Other alternative configurations for the upper portion 212 of sensor assembly 200 so as to facilitate its manufacture and/or assembly will be apparent to those skilled in the art.

Referring again to FIG. 9, the following example partially illustrates a simple instance in the operation of sensor assembly 200. When sufficient tactile pressure is applied to shroud 250 in a position corresponding to the location of conductive strip 270, conductive strip 270 is shifted into contact with, and provides an electrical connection between, conductive region 230 and conductive region 232. As previously alluded to, conductive region 230 and conductive region 232 are ordinarily (i.e., when not electrically connected by conductive strip 270) at different electrical potentials; for example, conductive region 230 is ordinarily "floating" (i.e., not connected to any definite electrical potential), whereas conductive region is ordinarily at a potential on the order of several volts (e.g., +5 volts or so). Correspondingly, the resulting electrical connection between region 230 and region 232 results in an appropriate signal (e.g., +5 volts or so) being provided at a corresponding output of sensor assembly 200. The signal at the corresponding output of sensor assembly 200 is electrically coupled, via input interface 200, to processing circuitry within device 100. The processing circuitry within device 100 interprets the signal and directs device 100 and/or one or more software applications within device 100 to perform a corresponding function. The preceding statement assumes, of course, that the given tactile input has already been assigned to a corresponding function of device 100 and/or of one or more software applications installed in device 100.

Although the foregoing description has largely focused upon the operation of sensor assembly 200 in response to a single input, it should be appreciated that sensor assembly 200 is likewise capable of receiving multiple simultaneous inputs; correspondingly, the processing circuitry within device 100 may detect and act upon the application two or more tactile inputs to different positions along sensor assembly 200. The two or more simultaneous tactile inputs may be treated as two or more separate inputs (with each input having been assigned to a different function) that control two or more different functions. Alternatively, the two or more simultaneous tactile inputs may be treated by device 100 as effectively constituting a single input that causes device 100, or software within device 100, to perform a single function, for example.

As a further example of the functional capabilities of sensor assembly 200 in the context of device 100, it should be appreciated that sensor assembly 200 and the processing circuitry within device 100 may be readily configured such that sensor assembly 200 may function as a form of sliding switch. More specifically, device 100 may be configured to detect a tactile pressure that slides along the length, or some portion of the length, of sensor assembly 200, and to utilize that detection for appropriate functions, such as volume control or menu scrolling, for which a sliding motion is an intuitive and convenient manner of control.

Device 100 is not limited to including only a single sensor assembly and a single auxiliary input interface, but, as has been mentioned, may include multiple sets of sensor assemblies and auxiliary input interfaces, with many different options for positioning the sets along available exterior surfaces of the device. For example, each set may be situated along one or more surfaces, and/or two or more sets may be situated on the same surface. The deployment of multiple sets is especially advantageous for implementing functions relating to a user's hand grip. As will be appreciated by those skilled in the art, the use of multiple sets (e.g., a first set situated on the left side surface portion 110 of the device, a second set situated on the right side surface portion 116 of the device housing 102, and a third set situated along a top side surface portion 118 of the device housing 102) generally provides, in comparison with use of only a single set along one edge of the device, for more accurate and reliable detection of a user's hand grip position.

Figure 10:
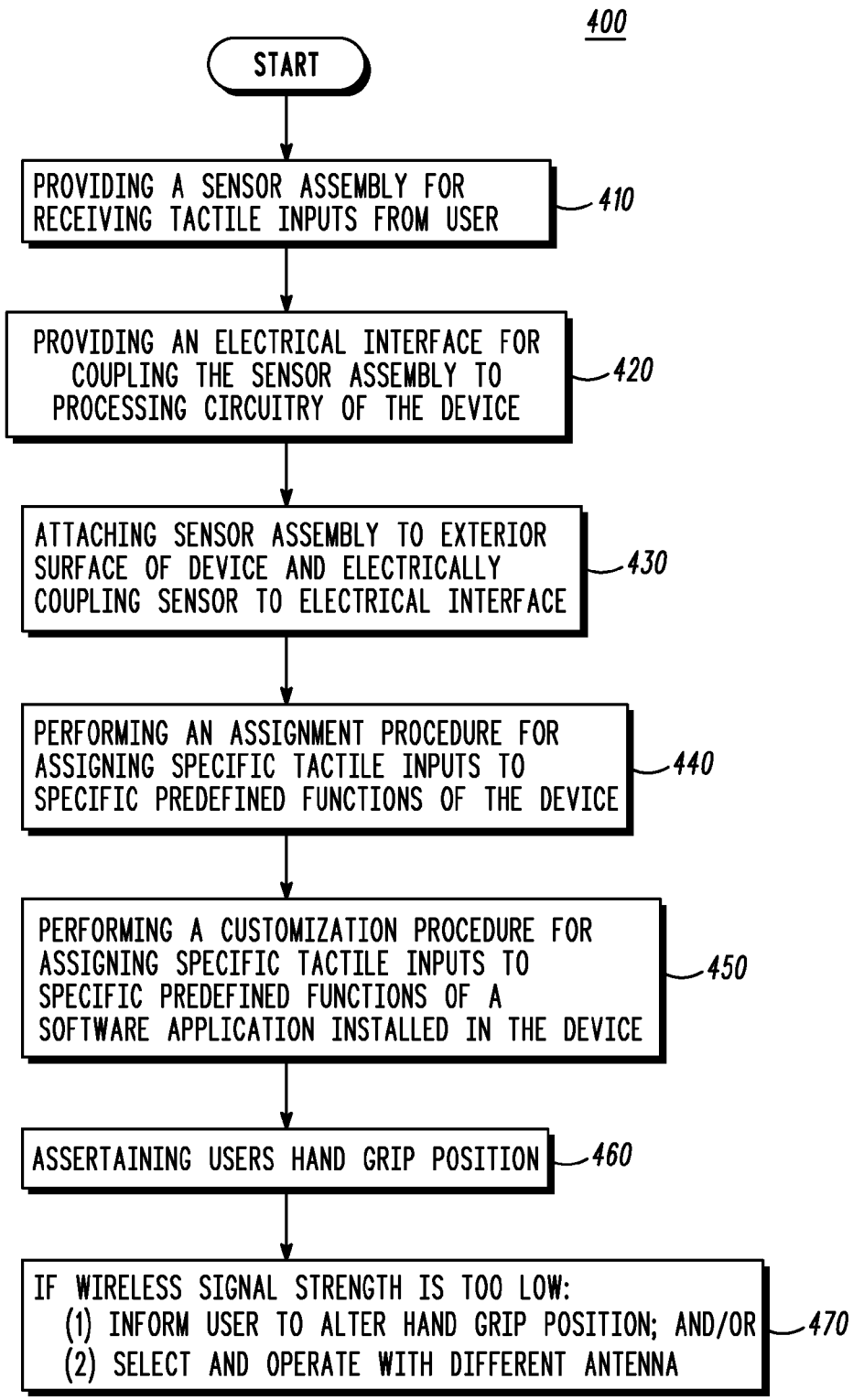
FIG. 10 is a flowchart describing one method for adapting a hand-held communication device to include an auxiliary input apparatus, in accordance with a preferred embodiment of the present invention.

FIG. 10 describes a method 400 for adapting a hand-held communication device to include an auxiliary input apparatus. Much of the functionality embodied in the steps of method 400 has already been elaborated upon in the foregoing description of the preferred apparatus described with reference to FIGS. 1-9.

Referring to FIG. 10, method 400, in one form, comprises the following steps: (1) in step 410, providing a sensor assembly for receiving tactile inputs from a user; (2) in step 420, providing an electrical interface for mating with the sensor assembly; (3) in step 430, attaching the sensor assembly to an exterior surface of the device and electrically coupling the sensor assembly to the electrical interface; and (4) in step 440, performing an assignment procedure for assigning specific tactile inputs to specific predefined functions of the device.

In step 410, the sensor assembly is understood to include a plurality of pressure sensors and a plurality of outputs. In step 420, the electrical interface is provided along at least one exterior surface of the device and is adapted for mating with the sensor assembly. In step 440, upon completion of the assignment procedure, the device will operate such that each of the specific predefined functions is performed in response to specific tactile inputs being applied by the user to the sensor assembly.

Preferably, and as described in FIG. 10, method 400 may further comprise the steps of: (5) in step 450, performing a customization procedure. Alternatively, or in addition to steps (4) and (5) described above, the method can further include: (6) in step 460, ascertaining a user's hand grip position; and (7) in step 470, in response to the field-intensity strength of the wireless signal being too low, to execute at least one of the following actions: (i) inform the user to alter the hand grip position; and (ii) select and operate with a different antenna or a combination of antennas.

In step 450, the customization procedure serves to assign specific tactile inputs to specific predefined functions of one or more software applications installed in the device. In step 460, the function of ascertaining the user's hand grip position may be used for any of a number of purposes, including the functions outlined in step 470. In step 470, if a wireless signal that is received by the device has a field-strength intensity of less than predetermined level, the device acts to: (i) inform the user (by a suitable audible or visual indication) to change the hand grip position (so as to, hopefully, increase the field-strength intensity of the wireless signal); and/or (ii) select and operate with a different antenna (assuming, of course, that the device is equipped with two or more antennas that are suitable for receiving the wireless signal).

In a preferred implementation of method 400, the hand-held communication device is a cellular telephone, and the specific predefined functions of the device (which functions may be accessed/executed by the user applying specific tactile inputs to the sensor assembly) include, by way of example, a speed-dial function, a phone directory review function, a combined phone directory review and speed-dial function, and an expedited menu access function. Details regarding each of these functions have already been discussed herein. It is contemplated that the predefined functions may further include any or all of a large number of other functions that are commonly present in cellular telephones and other types of hand-held communication devices.

The predefined functions may also include those included in popular video games. In existing video game controllers, it is common for the player to customize his "controller" such that a specific button performs a specific task in the game (such as have the man jump). A cell phone user can purchase a sensor assembly 200 for their phone 100 with downloadable software that will use a certain predetermined grip to activate a certain predetermined gaming function. The software, which can be provided by the gaming company for example, may also be flexible enough to allow the user to customize a grip to a gaming function. The reason for this is different gaming customers will have different sized hands and even though they use the same grip, different sensors will be activated due to the variance in hand sizes. The differences in hand sizes will preferably be "tunable" by creative software. Thus, a person's cell phone 100 will be programmed to the user's personal preferences of what the phone 100 should do for each grip, and also custom programmed to function optimally for the owner's hand size and shape.

Although the present invention has been described with reference to certain preferred embodiments, numerous modifications and variations can be made by those skilled in the art without departing from the novel spirit and scope of this invention.

For example, sensor assembly 200 and input interface 300 are each capable of being realized by any of a large number of mechanical assemblies and electrical configurations. When sensor assembly 200 is realized in its preferred form as including an elastomeric connector, it will be understood by those skilled in the art that the elastomeric connector may be selected to have any of a large number of available geometries; the particular geometry that is preferred for a given use is largely dictated by the goal of providing an auxiliary input apparatus that is feasible, reliable, space-efficient, cost-effective, and ergonomic. Moreover, auxiliary input interface 300 need not be realized by a printed circuit board (e.g., a flex circuit), but may be implemented in other ways, such as by providing a row of electrical contacts mounted along the exterior surface of device 100.

What is claimed is:

1. A method for adapting a hand-held communication device to include an auxiliary input apparatus, the method comprising the steps of:
   providing a sensor assembly comprising a plurality of pressure sensors and a plurality of outputs, wherein the sensor assembly is adapted to receive tactile inputs from a user;
   providing an electrical interface along at least one exterior surface of the device, wherein the electrical interface is adapted for mating with the sensor assembly;
   attaching the sensor assembly to the at least one exterior surface of the device, such that the outputs of the sensor assembly are electrically coupled to the electrical interface; and
   performing an assignment procedure wherein specific tactile inputs to the sensor assembly are assigned to specific predefined functions of the device, such that the device is operable to perform each of the specific predefined functions in response to specific tactile inputs being applied to the sensor assembly;
   wherein the hand-held communication device is a cellular telephone; and
   wherein the specific predefined functions of the device include at least one of:
      a speed-dial function, wherein the cellular telephone dials a pre-assigned telephone number in response to a specific tactile input;
      a phone directory review function, wherein the cellular telephone audibly announces a list of stored names in response to a specific tactile input;
      a combined phone directory review and speed-dial function, wherein:
         (i) in response to a first specific tactile input, the cellular telephone audibly announces a list of stored names; and
         (ii) in response to a second specific tactile input that is received while the telephone is audibly announcing the list of stored names, the cellular telephone speed-dials a telephone number corresponding to the last stored name that has been audibly announced at the time when the second specific tactile input is received; and
      an expedited menu access function, wherein the cellular telephone displays a pre-assigned screen menu in response to a specific tactile input.

2. The method of claim 1, further comprising the step of performing a customization procedure, wherein specific tactile inputs to the sensor assembly are assigned to specific predefined functions of at least one software application installed in the device, such that the software application and the device are operable to perform the predefined functions in response to corresponding tactile inputs being applied to the sensor assembly.

3. The method of claim 1, further comprising the steps of:
   ascertaining a user's hand grip position; and
   in response to a wireless signal having a field-strength intensity of less than a predetermined level, performing at least one of the following steps:
      (i) informing the user of a need to alter the hand grip position; and
      (ii) selecting and operating with an appropriate antenna from a plurality of antennas within the device such that the field-strength intensity of the wireless signal is increased.

* * * * *